United States Patent [19]

Hörig

[11] Patent Number: 4,587,894
[45] Date of Patent: May 13, 1986

[54] CONTROL DEVICE FOR DOSING EMULSIFIERS IN CHOCOLATE MASS

[75] Inventor: Jürgen Hörig, Heidenau, German Democratic Rep.

[73] Assignee: Veb Kombinat Nagema, Dresden, German Democratic Rep.

[21] Appl. No.: 702,450

[22] Filed: Feb. 19, 1985

Related U.S. Application Data

[62] Division of Ser. No. 626,623, Jul. 2, 1984, Pat. No. 4,563,361.

[30] Foreign Application Priority Data

Jul. 1, 1983 [DD] German Democratic Rep. ... 252641

[51] Int. Cl.4 .............................................. A23G 1/00
[52] U.S. Cl. ........................................ 99/487; 99/468
[58] Field of Search ................. 99/474, 485, 516, 534, 99/452, 460, 487, 486, 468; 426/475, 486, 487, 518, 629; 241/33, 34; 366/151, 154, 159, 160, 162, 182

[56] References Cited

U.S. PATENT DOCUMENTS 3,628,965 12/1971 Nijkerk .............................. 99/474 X
4,380,193 4/1983 Tadema ............................. 99/487 X Primary Examiner—Timothy F. Simone
Attorney, Agent, or Firm—Michael J. Striker

[57] ABSTRACT

A continuous stream of chocolate mass is dosed with lecithin or similar emulsifiers by means of an electronically controlled dosing pump. The throughput or the weight rate of the flow of the chocolate mass is detected by a weighing device and the amount of the emulsifier to be added is adjusted to the changes of the throughput. The percentage of the emulsifier is preselected. The dosing time of each charge of the chocolate mass is determined as a first time interval from the detected weight rate of flow. During the dosing of a charge, a second time interval which is a predetermined fraction of the first time interval, is determined for the next charge during the dosing of a preceding charge. A control unit actuates a time counter for determining the first time interval whose value is stored in an intermediate storage. An operation counter determines the second time intervals and activates a control unit for the emulsifier dosing pump.

4 Claims, 1 Drawing Figure

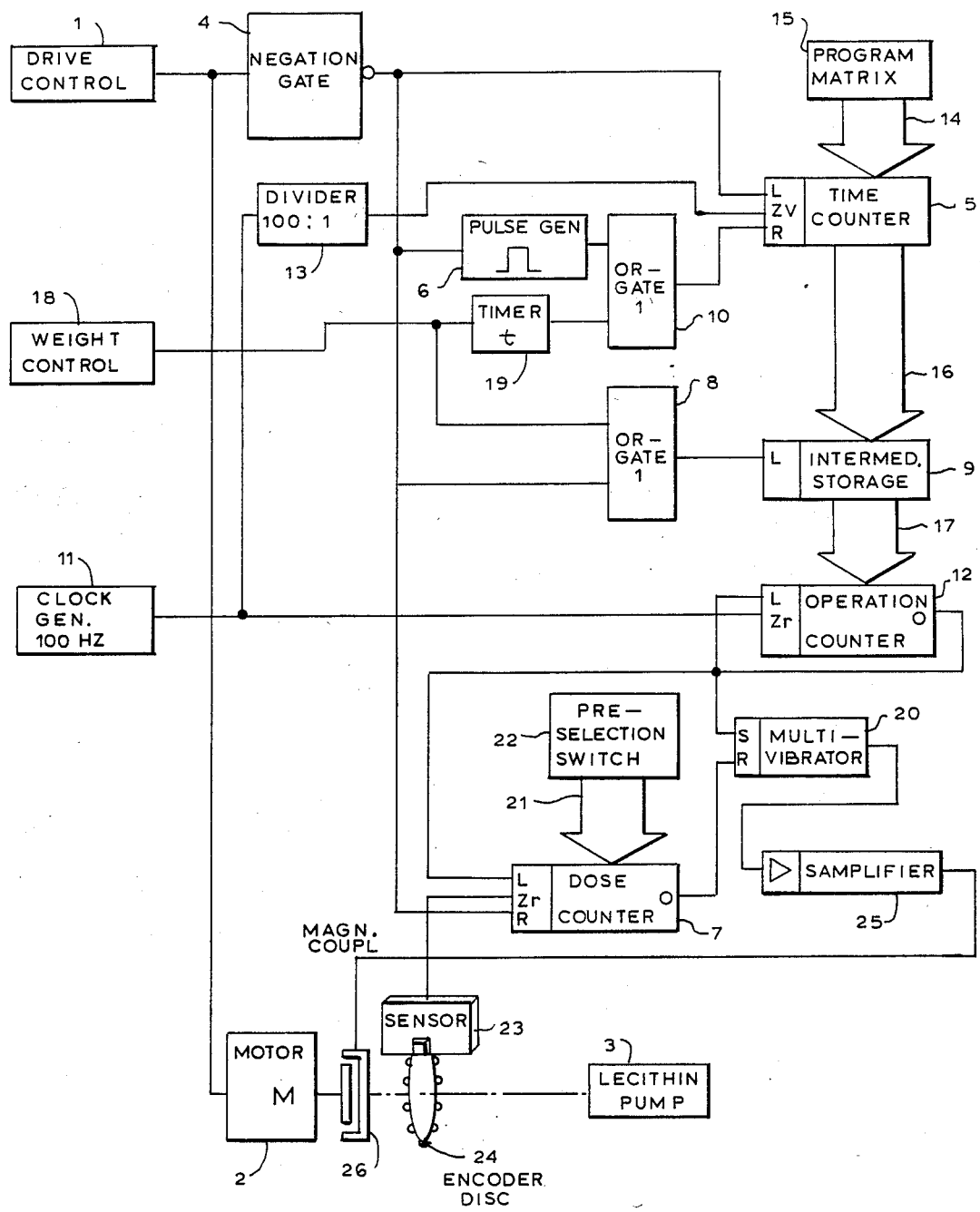

CONTROL DEVICE FOR DOSING EMULSIFIERS IN CHOCOLATE MASS

This is a division of application Ser. No. 626,623, filed July 2, 1984, now U.S. Pat. No. 4,563,361.

BACKGROUND OF THE INVENTION

The invention relates in general to the manufacture of chocolate and in particular it relates to a method of and a control device for dosing lecithin or similar emulsifier in chocolate mass processed in a continuously operating plant which includes a weighing device for detecting the weight rate of flow of the chocolate mass, and a continuously operating dosing pump arrangement for the lecithin.

For continuous dosing of lecithin in a chocolate mass it has been known to change the dosage by adjusting the rotary speed of a pump operating as a dosing apparatus.

Known are also dosing pumps in which the measured quantity or the dose is changed in dependency on the piston stroke.

Both prior art arrangements for adjusting dosage have the disadvantage that they necessitate costly regulating technology for matching the continuous changes of the weight rate of the flow of the chocolate mass. Moreover, there occur dosing inaccuracies due to fluctuations in the rotary speed of the dosing pump.

SUMMARY OF THE INVENTION

It is therefore a general object of the present invention to overcome the aforementioned disadvantages.

More particularly, it is an object of the invention to provide an improved dosing method and device which guarantees optimum quality of the processed chocolate mass by improving the metering of lecithin in the mass in compliance with recipes.

Another object of this invention is to provide such an improved dosing method and device which safeguards the processed chocolate mass against errors in prescribed treatment.

An additional object of the invention is to provide such an improved method and device which continuously adjusts the amount of lecithin to be dosed according to the weight rate of flow of the chocolate mass detected in charges and electronically controls the preselected percentage of lecithin, whereby the dosage of lecithin takes place in intervals, while the chocolate mass flows in a continuous stream.

In keeping with these objects and others which will become apparent hereinafter, one feature of the method of this invention resides in determining in steps up to one second, the dosing time for each charge of a first chocolate mass as a function of the specific magnitude of the weight rate of the flow of chocolate mass, and then determining from 100th of the value of the first dosing time a second time interval for the lecithin dosage added during the dosing time of the following charge of the chocolate mass.

According to another feature of this invention, at the beginning of dosing of the first charge of the chocolate mass the time interval is set to a fixed value whose magnitude is computed from the mean value of the weight rate of flow of the chocolate mass.

The control device for carrying out the method of this invention includes a series connection of a time counter for determining the first dosing time interval, an intermediate storage for storing the computed dosing time value, and an operational counter for controlling the second intervals of dosing of the lecithin. According to another feature, the counting input of the operation counter is connected directly to a clock generator and the counting input of the dosing time counter is connected to the clock generator via a divider. The operation counter counts in continuous counting cycles whereby a counting cycle is 100th of the first dosing time of the preceding charge of the chocolate mass counted by the dosing time counter and stored in the intermediate storage. A start impulse is generated during each occurrence of zero count in the operation counter to start the second interval for the lecithin dosing.

The advantages of this invention reside particularly in the elimination of the dependency of the preselected dosing amount of the lecithin emulsifier on the weight rate of flow of the chocolate mass in the manufacturing plant. Instead the correction of the lecithin dosage deviations resulting from the fluctuation of the flow rate of the chocolate mass is obtained by the automatic adjustment of the second interval time of the lecithin dosing device. In this manner, a true conformity of the dosage with the prescribed recipe is achieved and the quality of the produced chocolate mass is insured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE illustrates a block circuit diagram of an electronic control device for matching the proportion of lecithin through fluctuations of the weight flow rate of a processed chocolate mass.

DESCRIPTION OF THE PREFERRED EMBODIMENT

According to the method of this invention, a fraction of the metering or dosing time of a charge of a chocolate mass is determined as a time interval for dosing or metering lecithin. For this purpose the dose control device of this invention includes a drive control apparatus 1 whose output is connected to a driving motor 2 of a lecithin pump 3 and simultaneously is connected to an input of a negation gate 4. The output of the negation gate is connected to the loading input L of a time counter 5, to the input of a pulse generator 6, to a resetting input R of a dose counter 7, and via an input of an OR-gate 8 to the loading input L of an intermediate storage 9. The output of the pulse generator 6 is connected via another OR-gate 10 to the resetting input R of the time counter 5. A clock pulse generator 11 operating at a pulse rate of 100 Hz is connected to a backward counting input Zr of an operation counter 12 and via a 100:1 divider 13 to the forward counting input of the time counter 5. Data setting inputs of time counter 4 are connected by data bus 14 to the output of a program storing matrix 15 so that the time counter 5 is set according to a fixed program. Data outputs of the time counter 5 are connected via data bus 16 to the inputs of the intermediate storage 9 and the data outputs of the storage 9 are connected by data bus 17 to the setting inputs of the operations counter 12. The output of a control unit 18 of a non-illustrated weighing device for determining the throughput or weight flow rate of charges of the chocolate mass, is connected to the input of a timer 19 and via the other input of the OR-gate 8 to the loading input of the intermediate storage 9. The output of timer 19 is connected via the other input of the OR-gate 10 to the resetting input of the time counter 5. Zero output of the operation counter is connected both to its own loading input L and to the loading input L of the dose counter 7, and also to the setting input of a bistable multivibrator 20. The dose quantity counter 7 receives via data bus 21 numerical values of the amounts of lecithin the chocolate mass is to be dosed with. The numerical values of the dosing amounts are preselected in the preselection switch 22. The backward counting input of the dose counter 7 receives signals from the sensor 23 of an encoder disc 24. Zero output of the dose amount counter 7 controls the resetting input of the bistable multivibrator 20 whose output is connected via a switching amplifier 25 to a magnetic coupling 26 which controls the mechanical connection between the driving motor 2 and the driven encoder disc 24 and lecithin pump 3.

The operation of the electronic control of the adjustment of the lecithin in proportion to the throughput or weight rate of flow of the chocolate mass, is as follows:

At first the program storing matrix 15 is loaded with preliminary data determined empirically from the mean or average throughput value of chocolate mass during the dosing time of the first charge. If no signal is delivered by the drive control unit 1 to the driving motor 2 and to the negation gate 4, the negation gate delivers a signal to the loading input of the time counter 5 and the stored contents of matrix 15 are transferred via data bus 14 to the outputs of the time counter 5.

The output data from the counter 5 are fed through data bus 16 to the inputs of the intermediate storage 9 whose loading input L has received via OR-gate 8 the output signal from the negation gate 4. As a consequence the data from the intermediate storage 9 are immediately outputted and transferred via data bus 17 to the setting inputs of the operation counter 12.

The backward counting input Zr of the operation counter 12 is continuously supplied with 100 Hz clock pulses generated by generator 11 and counts the preset value backward. As soon as a zero count is reached, a signal is generated at zero output of the counter 12 which is fed back to the loading input L of the counter 12 and of the dose counter 7. Due to the signal, the counter 12 is preset to a value delivered by the data bus 17, and the abovedescribed process is continuously repeated whereby at each zero count at the output of the operation counter 12 the setting inputs of the dose counter 7 are simultaneously supplied via data bus 21 with preset data from the preselection switch 32. The output pulse from the operation counter 12 also is applied to the setting input of the multivibrator 20 but at this time it remains without effect inasmuch as due to the output signal of the negation gate 4 which is applied to the resetting input R of the dose counter 7, a zero signal is present at the output O of the counter 7 and applied to the resetting input R of the multivibrator 20 so that the latter remains in its zero or low position.

As soon as the drive control unit 1 delivers at its output a control signal which activates the driving motor 2 the level of the output signal at the negation gate 4 is changed to zero and the loading input of the time counter 5 is directly blocked and the loading input of the intermediate storage 9 is blocked via the OR-gate 8. The change of potential at the output of negation gate 4 activates pulse generator 6 to generate a pulse which via OR-gate 10 is applied to the resetting input R of the time counter 5 and resets its output to zero. Clock pulses from the generator 11 pass through the 100:1 dividing counter 13 and the resulting 1 second pulses are supplied to the forward counting input ZV of time counter 5, thereby initiating the determination of the metering or dosing time for the first charge of the processed chocolate mass. The change of potentials at the output of the negation gate 4 also causes the clearance of the resetting input of the dose amount counter 7. With the occurrence of the next zero output pulse from the operation counter 12 at the loading input L of the dose amount counter 7, the preselected data from the preselection switch 22 are loaded via data bus 21 in the dose amount counter 7. Simultaneously, the zero pulse is applied to setting input S of the bistable multivibrator 20 and sets the latter so that the output signal from the multivibrator is amplified in the switching amplifier 25 and energizes the magnetic coupling 26. As a result the endcoder disc 24 is activated and sensor 23 starts delivering pulses which are counted backwards in the dose amount counter 7. As soon as a zero condition is reached at the output O of the dose amount counter, a zero output pulse is supplied to the resetting input R of the bistable multivibrator 20 so that its output is changed to its original state. As a result no output pulse is supplied to the amplifier 25 and the magnetic coupling 26 is inactivated and the dosing process is interrupted up to the occurrence of the zero output pulse from the operation counter 12. When from the weight control unit 18 a pulse "charge dosing completed" is supplied via the OR-gate 8 to the loading input L of the intermediate storage 9, then a new set of time data is entered from the time counter 5 via data bus 16 in the intermediate storage. In response to the falling edge of the pulse "charge dosing completed" the timing stage 19 is activated to deliver after a time period t an output pulse which is applied via OR-gate to the resetting input of the time counter 5 and resets the same to zero. Accordingly, another cycle of determining the metering or dosing time of the next charge of the treated chocolate mass is started. The dividing ratio of the divider 13 as well as the output of the encoder 24 are determined by the capacity or delivery of the lecithin pump 3.

It will be understood that each of the elements described above, or two or more together, may also find a useful application in other types of constructions differing from the types described above.

For example, it is possible to control the metering or dosing of the lecithin completely or partially by a program device.

While the invention has been illustrated and described as embodied in a specific example of dosing device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for dosing lecithin or similar emulsifier into a continuous stream of a chocolate mass, comprising means for detecting the weight rate of flow of the chocolate mass, a dosing pump for adding the emulsifier into the chocolate mass, control means for the dosing pump, a time counter coupled to the detecting means and to the control means to determine a first time interval corresponding to a next charge of the emulsifier into the stream of chocolate mass; means for generating digital signals corresponding to the first time interval and to a prescribed dosage of the emulsifier; an intermediate storage device for storing said digital signals; means for determining from the stored digital signals second time intervals each corresponding to a fraction of the first time interval; and means for activating the dosing pump during the second time intervals.

2. A control device as defined in claim 1, further comprising a clock pulse generator connected via a pulse divider to the time counter to determine the first time interval in seconds, the means for determining the second time intervals including an operation counter having a counting input directly connected to the clock pulse generator and an output connected to the means for controlling the dosing pump.

3. A control device as defined in claim 1, wherein the operation counter counts continuously in cycles whereby the time of one counting cycle corresponds to one hundredth of the first time interval of the preceding charge stored in the intermediate storage.

4. A control device as defined in claim 3, wherein the operation counter has an output which at the occurrence of a zero count delivers an output pulse which controls the start of the second time interval during which the dosing pump adds the emulsifier in the corresponding charge of the chocolate mass.

* * * * *